United States Patent
Amine et al.

[11] Patent Number: 5,981,106
[45] Date of Patent: Nov. 9, 1999

[54] POSITIVE ELECTRODE ACTIVE MATERIAL FOR LITHIUM BATTERY, METHOD FOR PRODUCING THE SAME, AND LITHIUM BATTERY CONTAINING THE SAME

[75] Inventors: Khalil Amine; Hideo Yasuda; Yuko Fujita, all of Kyoto, Japan

[73] Assignee: Japan Storage Battery Co., Ltd., Kyoto, Japan

[21] Appl. No.: 08/874,728

[22] Filed: Jun. 13, 1997

[30] Foreign Application Priority Data

Jun. 13, 1996 [JP] Japan .................................. 8-174232

[51] Int. Cl.[6] .................................................... H01M 4/50
[52] U.S. Cl. .......................................... 429/224; 423/599
[58] Field of Search ................................... 429/221, 223, 429/224; 423/599

[56] References Cited

U.S. PATENT DOCUMENTS

| | | | |
|---|---|---|---|
| 5,153,081 | 10/1992 | Thackeray et al. | 429/194 |
| 5,316,875 | 5/1994 | Murai et al. | 429/223 X |
| 5,370,948 | 12/1994 | Hasegawa et al. | 429/224 X |
| 5,415,957 | 5/1995 | Okada et al. | 429/221 X |
| 5,629,110 | 5/1997 | Kobayashi et al. | 429/224 X |

FOREIGN PATENT DOCUMENTS 0624552  11/1994  European Pat. Off. .

OTHER PUBLICATIONS

Capitaine F Et Al: "A new variety of LiMnO2 with a layered structure" Solid State Ionics, vol. 89, No. 3–4, Aug. 2, 1996, pp. 197–202 XP004069977.

Strobel P Et Al: "Synthesis and chimie douce reactions in lithium phyllomanganate" Materials Research Bulletin, vol. 31, No. 11, Nov. 1996, pp. 1417–1426 XP004053631.

Patent Abstracts of Japan, vol. 096, No. 005, May 31, 1996 for JP 08 007883A, Jan. 12, 1996.

Chemical Abstracts, vol. 125, No. 14, Sep. 30, 1996, Columbus, Ohio, US; abstract No. 183936, Caurant, Daniel et al: "Preparation by a 'chimie douce' route and characterization of $LiNi_zMn_{1-z}O_2$ ($0.5<=z<=1$) cathode materials" XP002072298 & J. Mater, Chem. (1996), 6(7), 1149–1155 Coden: JMACEP; ISSN: 0959–9428.

Chemical Abstracts, vol. 106, No. 26, Jun. 29, 1987, Columbus, Ohio, US; abstract No. 226231; Hewston, T.A. Et Al: "A survey of first–row ternary oxides: lithium metal oxide ($LiMO_2$)(M=scandium–copper)" XP002072299 & J. Phys. Chem. Solids (1987), 48(2), 97–108 Coden: JPCSAW; ISSN 0022–3697.

Tabuchi M Et Al: "Electrochemical and magnetic properties of lithium manganese oxide spinels prepared by oxidation at low temperature of hydrothermally obtained LiMnO2", Solid State Ionics, vol. 89, No. 1–2, Aug. 1, 1996, pp. 53–63 XP004070124.

Patent Abstracts of Japan, vol. 095, No. 004, May 31, 1995 for JP 07 010431 A (Tosoh Corp), Jan. 13, 1995.

Patent Abstracts Of Japan, vol. 095, No. 007, Aug. 3, 1995 for JP 07 101728 A (Tosoh Corp), Apr. 18, 1995.

*Primary Examiner*—Stephen Kalafut
*Attorney, Agent, or Firm*—Sughrue, Mion, Zinn, Macpeak & Seas, PLLC

[57] ABSTRACT

An inexpensive positive electrode active material for lithium batteries which comprises lithium manganate having a hexagonal layered structure with space group of R3m and exhibits continuous discharge voltage characteristics between 4.5 V and 2 V for metallic lithium.

20 Claims, 3 Drawing Sheets

POSITIVE ELECTRODE ACTIVE MATERIAL FOR LITHIUM BATTERY, METHOD FOR PRODUCING THE SAME, AND LITHIUM BATTERY CONTAINING THE SAME

BACKGROUND OF THE INVENTION

1. Field of the Invention

The present invention relates to a positive electrode active material for a lithium battery, a method for producing the same, and a battery containing the same in the positive electrode thereof.

2. Description of the Related Art

With the recent development of portable electronic equipment, batteries of higher performance have been demanded. Lithium ion batteries using a carbon material in the negative electrode and lithium cobaltate ($LiCoO_2$), which is a composite oxide having a layer structure, in the positive electrode have been put to practical in a nonaqueous battery having a high working voltage and a high energy density. Lithium nickelate (Li-containing nickel oxide; $LiNiO_2$) is also a compound having the same layered crystal structure as the lithium cobaltate in which lithium ions are intercalated between layers of $NiO_6$ octahedral sharing edges.

Lithium nickelate is generally prepared by mixing a nickel source selected from $Ni(NO_3)_2$, $Ni(OH)_2$, $NiCO_3$, $NiO$, $NiOOH$, etc. and a lithium source selected from $LiOH$, $LiNO_3$, $Li_2CO_3$, $Li_2O_2$, etc., and subjecting the mixture to a heat treatment at about 600 to 900° C. in an oxygen stream.

Since cobalt or nickel used in these active materials is expensive for scarcity, less expensive active materials for a positive electrode has been sought. For example, Li-containing manganese composite oxide ($LiMn_2O_4$) having a spinel structure has been proposed, but its theoretical capacity of 148 mAh/g is low, and the reduction in capacity increases with charge and discharge cycles.

$LiMnO_2$ has been proposed as a promising active material for batteries with higher performance. Among various phases exhibited by $LiMnO_2$, two phases, whose crystal structure have been well characterized, are a high temperature orthorhombic phase (Pmnm) and a low temperature tetragonal phase ($I4_1/amd$). Both structures involve cubic close packing but they differ in the arrangement of the ordering of the lithium and manganese cations. The tetragonal form $Li_2Mn_2O_4$ is prepared by electrochemically or chemically intercalating lithium into the spinel $LiMn_2O_4$ [Mat. Res. Bull, 18(1983)461 & 18(1983)1375; J. Electrochem. Soc. 138(1991)2864 & 139(1992)937]. The orthorhombic phase has been prepared mainly by the solid state reaction at high temperature using different precursors [J. Phys. Chem. Solid. 3(1957)20 & 318; J. Phys. Radium 20(1959)155; J. Anorg. Allg. Chem. 417(1975)1; Mater. Res. Bull. 28(1993)1249]. However, orthorhombic $LiMnO_2$ was reported to be prepared at low temperature using the solid state reaction by heating a mixture of γ-MnOOH and LiOH at 300 to 450° C. [Chem. Express, 7(1992)193]. Another process for preparing the orthorhombic $LiMnO_2$ at a temperature less than 100° C. by ion exchange was reported. [J. Electrochem. Soc. 140(1993)3396; Unexamined Japanese Patent Publication (kokai) No. 6-349494] In this case, the exchange was carried out by refluxing γ-MnOOH under boiling condition in LiOH solution. So far, $LiMnO_2$ isostractural with layered $LiNiO_2$ or $LiCoO_2$ has not yet been synthesized.

Referring to $LiMnO_2$ having a layer structure, J. Solid State Chem., 104(1993)464 and U.S. Pat. No. 5,153,081 report that $LiMnO_2$ having a monoclinic layer structure can be obtained by acid leading of $Li_2O$ out of $Li_2MnO_3$. In the first step, $Li_2MnO_3$ was prepared by reacting electrolytic manganese dioxide (EMD) with a stoichiometric quantity of $Li_2O_3$. The obtained material was then delithiated using $H_2SO_4$ at room temperature for 64 hours.

The thus obtained substance exhibits a discharge voltage of 3 V vs. Li/Li$^+$. Although the reaction product exhibits a new X-ray diffraction peak at 2θ=19.5°, most of the other peaks correspond to the starting material which is $Li_2MnO_3$ (U.S. Pat. No. 5,153,081). Ignoring the fact that most of the peaks are assigned to the starting $Li_2MnO_3$, the inventors of U.S. Pat. No. 5,153,081 identify the product to be a substance having a layer structure based on the peak at 2θ=19.5°, but the identification seems to be decisively unreasonable. In this case, the product should rather be regarded as a lithium manganese oxide having a spinel structure as a basic skeleton, such as $Li_2Mn_4O_9$ or $Li_4Mn_5O_{12}$.

Further, J. Solid State Chem., 104(1993)464 reports a substance having a layer structure whose X-ray diffraction pattern is different from those of $LiNiO_2$ or $LiCoO_2$. While not entering into details about structural refinement of the substance, the report based their layered structure on the assumption that removal of $Li_2O$ from $Li_2MnO_3$ causes a shearing of the closed-packed oxygen planes to yield an oxygen array in the obtained material comprised of alternate layers of trigonal prisms where lithium is located and sheets of edge-shared octahedra where manganese is located. In this case, the manganese ions remain in alternate layers and do not migrate to the lithium layers during the leaching process, and the lithium layer is arranged in a zig-zag fashion with lithium ions in a trigonal prismatic coordination.

Unexamined Japanese Patent Publication (kokai) No. 7-223819 reports that $LiMnO_2$ having a layer structure with a lattice constant of a=3.321 Å and c=4.730 Å is obtained by electrolysis method. This material is not isostructural with $LiNiO_2$. Thus, no $LiMnO_2$ having a layer structure similar to that of $LiNiO_2$ or $LiCoO_2$, has been synthesized yet.

As stated above, although 4.0 V type $LiMn_2O_4$ having a spinel structure has been proposed as an inexpensive Li-containing manganese composite oxide, the theoretical capacity is inferior to oxide compounds having a hexagonal layer structure, such as $LiNiO_2$ (theoretical capacity: 275 mAh/g) and $LiCoO_2$ (theoretical capacity: 274 mAh/g). In addition, the charge and discharge cycle characteristics are better in layered oxide materials. Therefore, development of an inexpensive active material having a layer structure similar to that of $LiNiO_2$ or $LiCoO_2$ and establishment of synthesis therefore have been keenly demanded, but a useful method of synthesis has not yet been established.

SUMMARY OF THE INVENTION

It is an object of the present invention to prepare lithium manganate with a structure different from the spinel structure of known $LiMn_2O_4$ but is analogous to the hexagonal layer structure of lithium cobaltate or lithium nickelate, having a space group of R3m, and is therefore expected to exhibit increased activity as a positive electrode active material for lithium batteries.

The present invention provides a positive electrode active material for lithium batteries which comprises lithium manganate having a hexagonal layer structure with space group of R3m and exhibits continuous discharge voltage characteristics between 4.5 V and 2 V vs. Li/Li$^+$. The active material according to the present invention has a theoretical capacity of 286 mAh/g.

The present invention also provides a method for producing such a positive electrode active material, and a battery containing the positive electrode active material.

The positive electrode active material according to the present invention undergoes homogeneous reaction to exhibit continuous discharge voltage characteristics between 4.5 V and 2.0 V vs. Li/Li$^+$. The discharge characteristics are stable upon cycling, providing a long battery life. The active material of the invention is inexpensive and economical.

DETAILED DESCRIPTION OF THE INVENTION

Figure 1C:
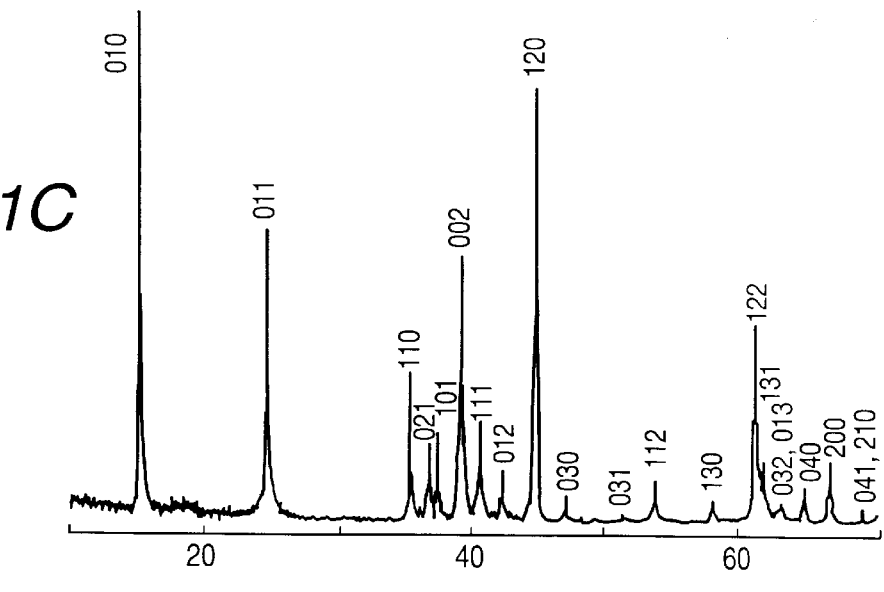
FIG. 1C shows an X-ray diffraction patterns of LiMnO$_2$ with orthorhombic structure obtained by a conventional solid phase reaction.

The lithium manganate according to the invention is not the known LiMnO$_2$ obtained by the reaction between γ-MnOOH and LiOH in a solid phase calcination process but LiMnO$_2$ which is obtained by a hydrothermal reaction of γ-MnO$_2$ in an LiOH solution and has a layer structure similar to the structure of LiNiO$_2$ or LiCoO$_2$. The lithium manganate of the present invention can be applied as a positive electrode active material in an nonaqueous solution to provide inexpensive and high-performance batteries.

The active material according to the present invention has a layer structure similar to the structure of LiNiO$_2$ or LiCoO$_2$, i.e., a structure similar to α-NaFeO$_2$.

The layered structure of the active material can be described from a packing MnO$_2$ slabs built up of edge-sharing MnO$_6$ octahedra in between which lithium ions are located in the octahedral oxygen environment. This structure comprises a layer of manganese ions in octahedral environment surrounded by oxygen ions arranged in a cubic close packed arrangement resulting in the formation of sheets of edge-shared octahedra. It also comprises a lithium layer where lithium is having an octahedral environment and is sandwitched between two layers of octahedral MnO$_6$.

The active material according to the present invention was found to have a layer structure having a lattice constant of a=2.86 Å and c=14.23 Å similarly to LiNiO$_2$ or LiCoO$_2$. The lattice constant is not a fixed one. That is, the unit lattice constant is subject to variation from 2.76 to 2.96 Å as for a, and from 14.13 to 14.33 Å as for c according to the conditions of preparation or by addition of dopant such as nickel, cobalt zinc, etc. The active material exhibits continuous discharge characteristics between 4.5 V and 2 V vs. Li/Li$^+$.

The active material of the invention is preferably produced by dissolving or suspending a starting manganese salt in lithium solution and causing the solution to react in an autoclave under high pressure and low pH solution. Suitable raw manganese materials are inorganic salts such as MnO$_2$, Mn$_2$O$_3$, MnOOH, and MnCO$_3$, and organic salts such as manganese acetate, manganese butyrate, manganese oxalate, and manganese citrate. Suitable raw lithium materials are LiOH, LiNO$_3$, Li$_2$CO$_3$, Li$_2$O, lithium acetate, lithium butyrate, lithium oxalate, and lithium citrate. Solvents to be used in the reaction are purified water, and organic solvents such as ethyl alcohol, methyl alcohol, acetone, and acetonitrile. The reaction is preferably carried out at a high temperature of from 100 to 300° C.

LiMnO$_2$ having a layer structure can be synthesized by a hydrothermal process. The high-pressure and low-temperature hydrothermal process according to the present invention is also applicable to synthesis of other substances having a layer structure represented by general formula AMeO$_2$ (A: Li, Na or K; Me: Mn, Ni, Co, Fe, Cr or V).

EXAMPLES

The present invention will be described in greater detail with reference to examples, but it should be understood that the present invention is not constructed as being limited thereto.

668 mg of LiOH was dissolved in 120 ml of water at 50° C., and thereafter, 50 mg of γ-MnO$_2$ was immersed therein for 30 minutes. The pH of the solution was adjusted to 1 to 2 and the mixture was heated in an polytetrafluoroethylene-covered stainless steel autoclave at 170° C. and 300 atm for 5 days to obtain lithium manganate according to the present invention.

Figure 1B:
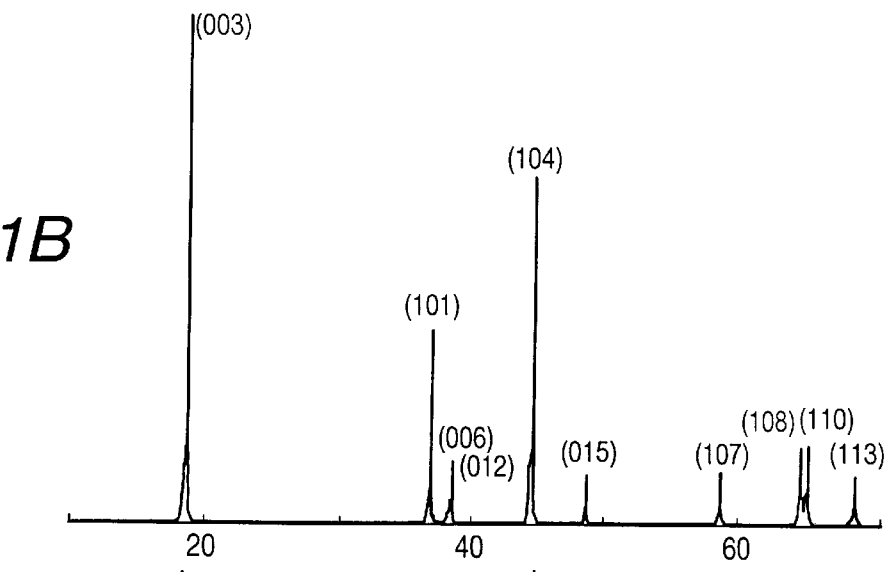
FIG. 1B shows an X-ray diffraction pattern of LiNiO$_2$ having a layer structure.
Figure 1A:
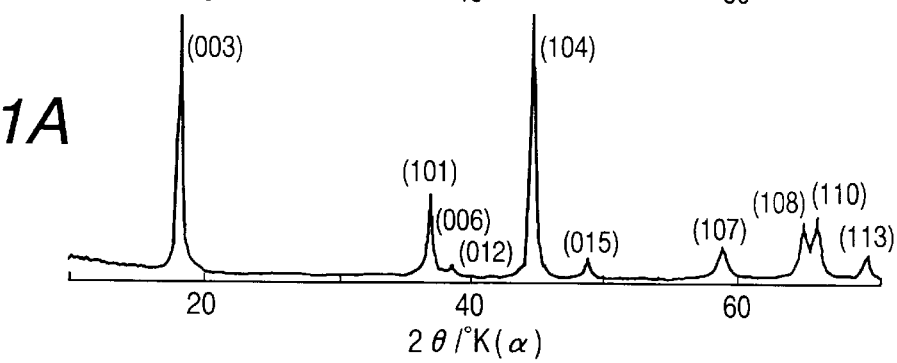
FIG. 1A shows an X-ray diffraction pattern of LiMnO$_2$ having a layer structure according to the present invention.

The X-ray diffraction pattern (CuKα) of the resulting active material is shown in FIG. 1A. For comparison, the diffraction pattern of LiNiO$_2$ having a layer structure is shown in FIG. 1B, and that of orthorhombic LiMnO$_2$ obtained by a conventional solid phase reaction (calcination of a mixture of γ-MnO$_2$ and LiOH at 700° C.) is shown in FIG. 1C.

Figure 2:
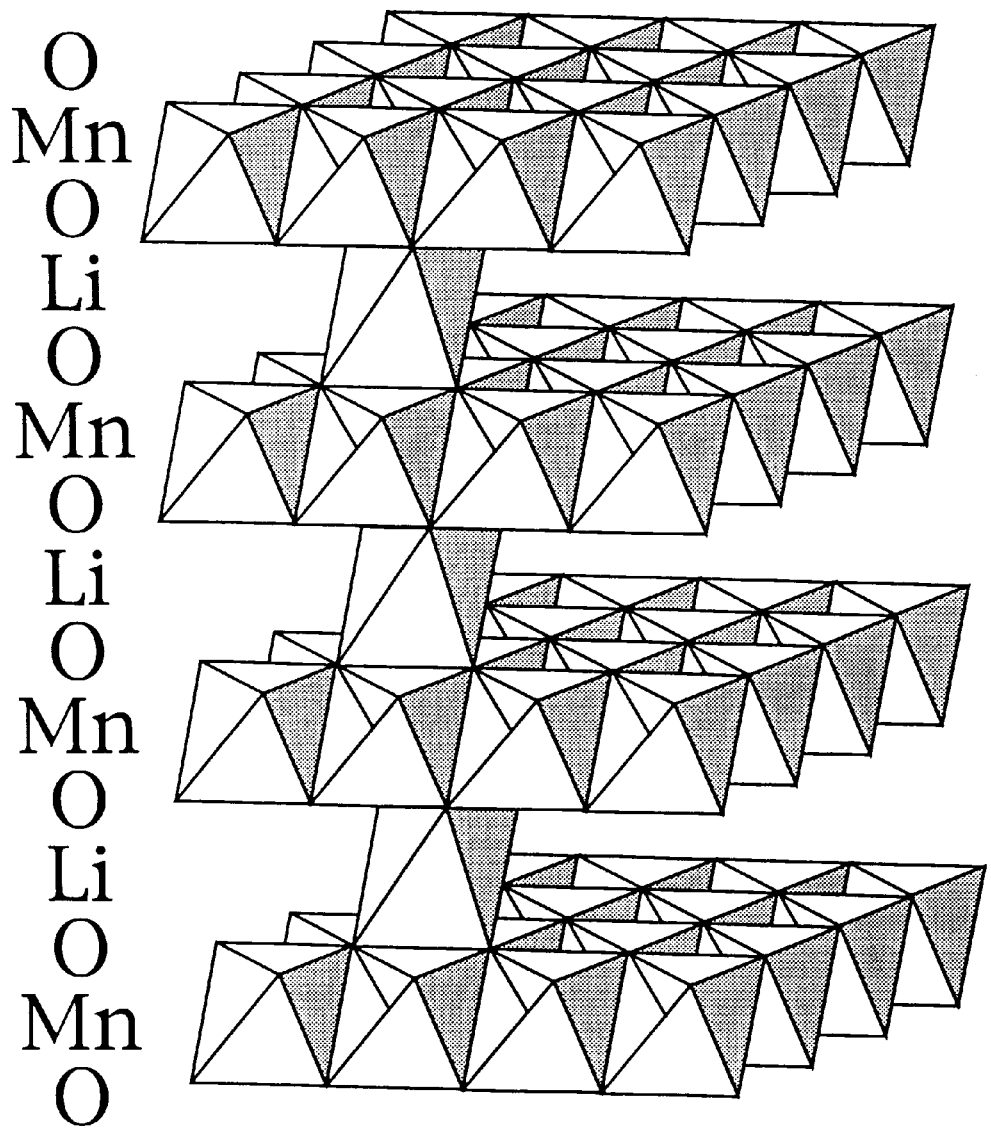
FIG. 2 shows an illustration of the layer structure of LiMnO$_2$ according to the present invention.

It can be seen that the diffraction pattern of the active material of the present invention is not similar to that of known orthorhombic LiMnO$_2$ but to that of LiNiO$_2$ having a layer structure. It was found that the indices of a plane of the diffraction peaks can be assigned to the layer structure of hexagonal system having a space group of R3m. The structural description of the active material of the invention is shown in FIG. 2.

The active material of the present invention has a packing structure of two MnO$_2$ layers composed of octahedral of MnO$_6$ sharing edges, in which a lithium ion is surrounded by oxygen ions having an octahedral coordination. In this structure, manganese ions are arranged in layers and surrounded by an octahedron of oxygen ions which are arranged in cubic closest packing to form an octahedral layer sharing edges. The lithium ion of the lithium layer is sandwitched in between two layers of octahedral of MnO$_6$.

It was found that the structure of the active material of the present invention is similar to the layer structure of LiNiO$_2$ or LiCoO$_2$, typically having a unit lattice constant of a=2.86 Å and c=$_{14.23}$ Å. The unit volume was 101.23 Å$^3$, approximately the same as 101.3 Å$^3$ of LiNiO$_2$. This means that the LiMnO$_2$ having a layer structure and LiNiO$_2$ are apt to form a solid solution. In fact, addition of nickel to LiMnO$_2$ results in stabilization of crystal properties, and the resulting solid solution was less susceptible to deterioration by charge and discharge cycles.

On the other hand, because of structural difference between orthorhombic LiMnO$_2$ and LiNiO$_2$, orthorhombic LiMnO$_2$ forms a solid solution LiMn$_x$Ni$_{1-x}$O$_2$ (0≦x≦0.5), but the solid solution has poor charge and discharge characteristics as reported in Solid State Ionics, 57(1992)311. It was confirmed that addition of cobalt to the active material of the invention produces the same effect. It is understood that the $LiMnO_2$ having a layer structure according to the invention is different from $LiMnO_2$ of orthorhombic structure the diffraction pattern of which is shown in FIG. 1C.

The active material obtained in this Example had a layer structure of perfect hexagonal system in which no substitution between manganese ions and lithium ions was observed. While structures in which lithium and manganese are substituted with each other were obtained in some cases depending on the temperature and pressure conditions of the hydrothermal reaction, the active material principally had a layer structure.

Figure 3:
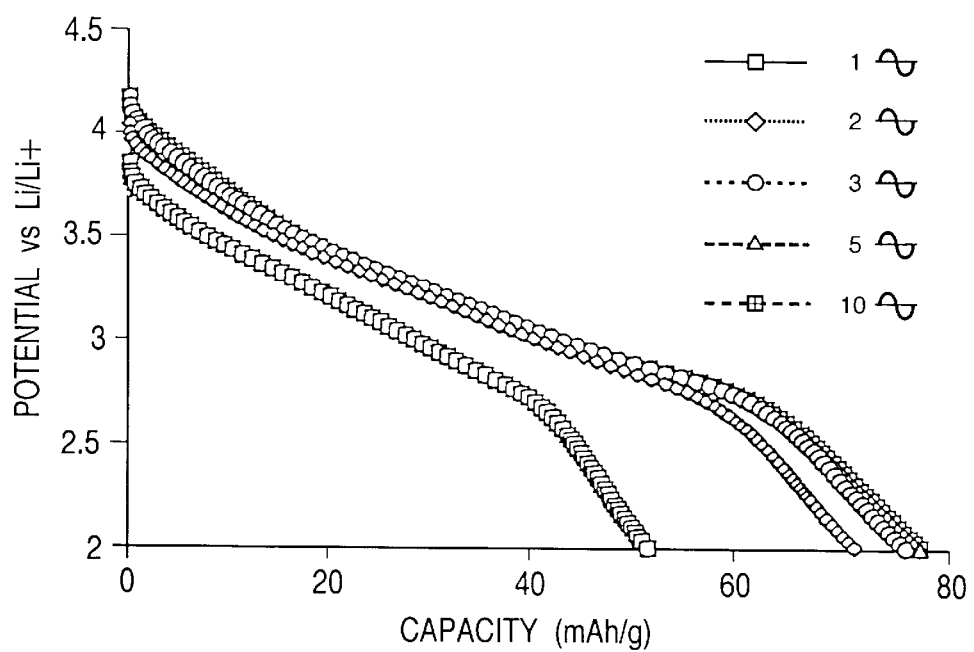
FIG. 3 shows typical discharge characteristics of LiMnO$_2$ according to the present invention.

A battery was prepared using thus obtained active material as a positive electrode active material and metallic lithium as a negative electrode. When the battery was charged to 4.2 V at a current of 0.2 C and then discharged to 2 V at the same current, satisfactory electrochemical activity was exhibited. The typical discharge characteristics are shown in FIG. 3. It is seen that stable discharge characteristics can be secured through the charge and discharge cycles. It is also seen that continuous discharge characteristics are exhibited between 4.5 V and 2 V vs. Li/Li$^+$, which has not been reported to date. The $LiMnO_2$ having a layer structure has now been proved to be an unreported inexpensive active material. The $LiMnO_2$ has a theoretical capacity density of 286 mAh/g. Further optimization of electrode designing will produce higher performance.

While the present invention has been described in detail and with reference to specific examples thereof, it will be apparent to one skilled in the art that various changes and modifications can be made therein without departing from the spirit and scope thereof.

What is claimed is:

1. A positive electrode active material for lithium batteries comprising lithium manganate having a hexagonal structure and a space group of R3m, and exhibiting continuous discharge voltage characteristics between 4.5 V and 2 V vs. Li/Li$^+$.

2. A positive electrode active material according to claim 1, wherein said lithium manganate has a unit lattice constant of a=2.76 to 2.96 Å and c=14.13 to 14.33 Å.

3. A positive electrode active material according to claim 1, further comprising at least one of nickel, cobalt, iron, chromium, zinc and vanadium as a dopant.

4. A lithium battery comprising a positive electrode active material for lithium batteries comprising lithium manganate having a hexagonal structure and a space group of R3m, and exhibiting continuous discharge voltage characteristics between 4.5 V and 2 V vs. Li/Li$^+$; and a negative electrode.

5. A lithium battery according to claim 4, wherein said negative electrode comprises metallic lithium, carbon and metal alloys.

6. A lithium battery according to claim 4, wherein said lithium manganate has a unit lattice constant of a=2.76 to 2.96 Å and c=14.13 to 14.33 Å.

7. A lithium battery according to claim 4, wherein said positive electrode active material further comprises at least one of nickel, cobalt, zinc, iron, chromium and vanadium as a dopant.

8. A method for producing a positive electrode active material for lithium batteries comprising reacting a raw manganese material and a raw lithium material by a hydrothermal process to produce a lithium manganate having a hexagonal structure.

9. A method according to claim 8, wherein said raw manganese material is selected from a group consisting of $MnO_2$, $Mn_2O_3$, MnOOH, $MnCO_3$, manganese acetate, manganese butyrate, manganese oxalate, and manganese citrate, and said raw lithium material is selected from a group consisting of LiOH, $LiNO_3$, $Li_2CO_3$, $Li_2O$, lithium acetate, lithium butyrate, lithium oxalate, and lithium citrate.

10. A method according to claim 8, wherein said hydrothermal process is carried out in a solvent selected from the group consisting of purified water, ethyl alcohol, methyl alcohol, acetone, and acetonitrile.

11. A method according to claim 8, wherein said hydrothermal process is carried out at a temperature of 100° C. or higher.

12. A method according to claim 11, wherein said hydrothermal process is carried-out at a temperature of 300° C. or less.

13. The method according to claim 8, wherein said hydrothermal process is carried out at a temperature greater than 100° C., but less than or equal to 300° C.

14. The method according to claim 8, wherein said hydrothermal process is carried out at a temperature of 170° C. and 300 atm.

15. A method for producing a positive electrode active material for lithium batteries comprising dissolving a raw lithium material in a solvent; adding a raw manganese material to the solution; adjusting the pH of the solution; and processing the solution under hydrothermal conditions to produce a lithium manganate having a hexagonal structure.

16. The method according to claim 15, wherein said raw manganese material is selected from a group consisting of $MnO_2$, $Mn_2O_3$, MnOOH, $MnCO_3$, manganese acetate, manganese butyrate, manganese oxalate, and manganese citrate, and said raw lithium material is selected from a group consisting of LiOH, $LiNO_3$, $Li_2CO_3$, $Li_2O$, lithium acetate, lithium butyrate, lithium oxalate, and lithium citrate.

17. The method according to claim 15, wherein said solvent is selected from the group consisting of purified water, ethyl alcohol, methyl alcohol, acetone, and acetonitrile.

18. The method according to claim 15, wherein said hydrothermal process is carried out at a temperature greater than 100° C., but less than or equal to 300° C.

19. The method according to claim 15, wherein said hydrothermal process is carried out at a temperature of 170° C. and 300 atm.

20. The method according to claim 15, wherein the pH is adjusted to 1 to 2.

* * * * *